Dec. 7, 1943.                H. A. PORTER                 2,335,883
                      FLEXIBLE TUBING FASTENER
                        Filed Oct. 7, 1941

INVENTOR.
HERBERT A. PORTER
BY George B. White
ATTORNEY.

Patented Dec. 7, 1943

2,335,883

UNITED STATES PATENT OFFICE 2,335,883

FLEXIBLE TUBING FASTENER

Herbert A. Porter, San Francisco, Calif.

Application October 7, 1941, Serial No. 414,031

1 Claim. (Cl. 248—56)

This invention relates to a wedge or fastener for the purpose of securing flexible insulating tubing in the usual holes, or knock-outs of an outlet or box or the like so as to positively hold the flexible tubing in place and also to fill and close the unused portion of the hole or knock-out through which the flexible tubing is inserted; the flexible tubing being of the type used around electric wiring.

Another object of this invention is to provide a flexible tubing fastener which is highly useful and simple in construction. Convenience of arrangement, lightness and comparative inexpense of manufacture are further objects which have been borne in mind in the production and development of the invention.

In manufacturing the device, while the various elements thereof may be constructed in any suitable manner and of any suitable material, yet it is preferable to form the same from sheet metal stampings on account of the cheapness, lightness and strength of the latter; but irrespective of these details in manufacturing, the essential features of the invention are always preserved.

With the foregoing and other objects in view, which will be made manifest in the following detailed description, reference is had to the accompanying drawing for the illustrative embodiment of the invention, wherein.

Figure 1:
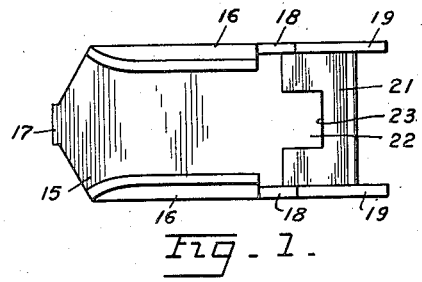
Fig. 1 is a top plane view of my fastener.
Figure 2:
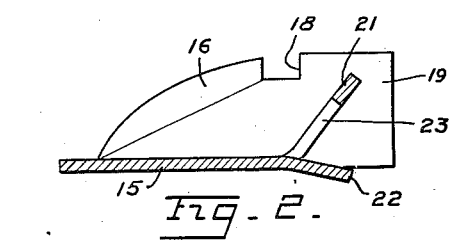
Fig. 2 is a sectional view of my fastener.
Figure 3:
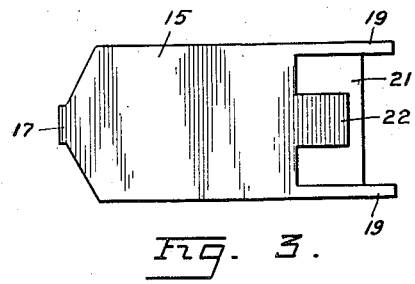
Fig. 3 is a bottom plane view of my fastener.

This invention particularly pertains to improvements on the type of flexible tubing fastener described in my previous Patent No. 1,530,617, granted March 24, 1925.

The flexible tubing fastener herein illustrated is preferably made of sheet metal. It has a base 15 with substantially parallel upturned sides 16 tapering toward an end 17 of said base. These sides 16 are provided with aligned notches 18 at the highest or largest part of their taper and spaced from the straight ends 19 of said sides 16.

The end of the base 15 between the straight ends 19 of the sides 16 is bent at an angle to the base so as to extend between the straight portions 19 of the sides 16. The bending line of this bent end 21 is substantially opposite to the respective notches 18. This bent end 21 extends to a point slightly below the free edges of the respective sides 16.

The base 15 is provided with a retaining finger 22. This finger 22 extends from the point of the base where the bent portion 21 joins the straight portion of the base 15. In the herein illustration the finger 22 is punched out of the bent portion 21 so that it leaves a hole 23 in said bent portion 21. The finger 22 is so punched out that it is joined to the base 15 and is bent toward the outer side of the base 15 oppositely to the bent portion 21. In other words the finger 22 is bent away from the space between the sides 16. The outer surface or side of the base 15 beyond the plane of which the finger 22 projects is the side which is in engagement with the flexible tubing. The angle of projection of the finger 22 is such as to tighten the engagement between the fastener and the flexible tube so as to prevent the removal of the flexible tube from the knock-out hole unless the fastener is first removed.

Figure 6:
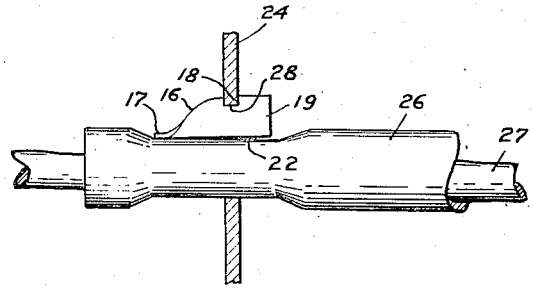
Fig. 6 is a side view of the fastener in position.
Figure 4:
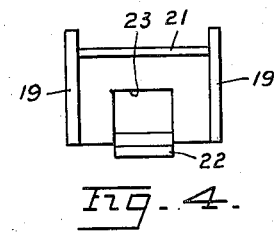
Fig. 4 is an end view of my fastener.
Figure 5:
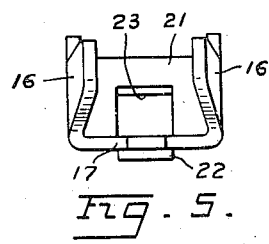
Fig. 5 is another end view of the fastener from the opposite end.
Figure 7:
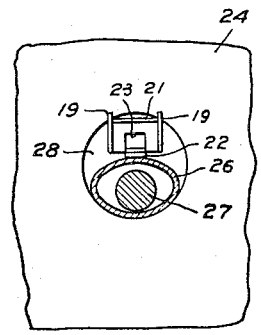
Fig. 7 is a sectional end view of the fastener in fastening position.

In Figures 6 and 7 a fragmental portion of the box wall 24 represents the usual wall around the hole or a knock-out hole of the type used on outlet boxes, fuse or switch boxes and the like electrical equipment in to which conductor wires are to be extended from the outside. The flexible tubing 26 has the conductor wire 27 therein and is usually considerably larger in diameter than the wire 27 so that it is comparatively free to slide on the wire 27. The end of the flexible tubing 26 is inserted so that the lower ends of the tapered sides 16 are leading the insertion of the fastener and form the point of the wedge. It is to be noted that the finger 22 projects away from the direction of insertion so that it does not hinder the insertion of the fastener in place. The wedge is inserted until the notches 18 are in engagement with the edges of the hole 28 and extend over the wall 24 around the hole 28. This engagement will hold the fastener firmly in place and against axial movement in the hole 28. The wedge or fastener by the engagement of its base 15 with the flexible tubing 26 partly flattens the flexible tube 26. The finger 22 still further dents into the periphery of the flexible tubing 26. The wedge or fastener may be inserted from either side of the hole 28 according to the direction from which the pulling force on the flexible tubing or loom is anticipated. The finger 22 should point in a direction opposite to the expected direction of pull so as to resist pulling forces in that direction. Of course the taper engagement of the finger 22 with the flexible tubing 26 creates increased frictional force which holds the tubing in position securely and prevents its sliding relatively to the bottom of the base 15 in either direction. In wedging the fastener the forces are applied to the straight ends 19 of the sides 16 and as the tapered sides 16 enter into the hole 28 they bear against the adjacent edges of the hole 28 and compress the flexible tubing. The tubing remains under pressure even after the notches 18 snap into place over the edge of the hole 28 and thus is held in place by the fastener herein described.

I claim:

A flexible tubing fastener, comprising a base having upturned sides tapering toward one end, said sides being provided with notches between the ends of the device at the highest portions of said sides, and a finger extended from the portion of the base substantially opposite said notches and in a direction outwardly from between the sides and substantially oppositely to the direction of said taper of said sides.

HERBERT A. PORTER.